Patented Oct. 16, 1928.

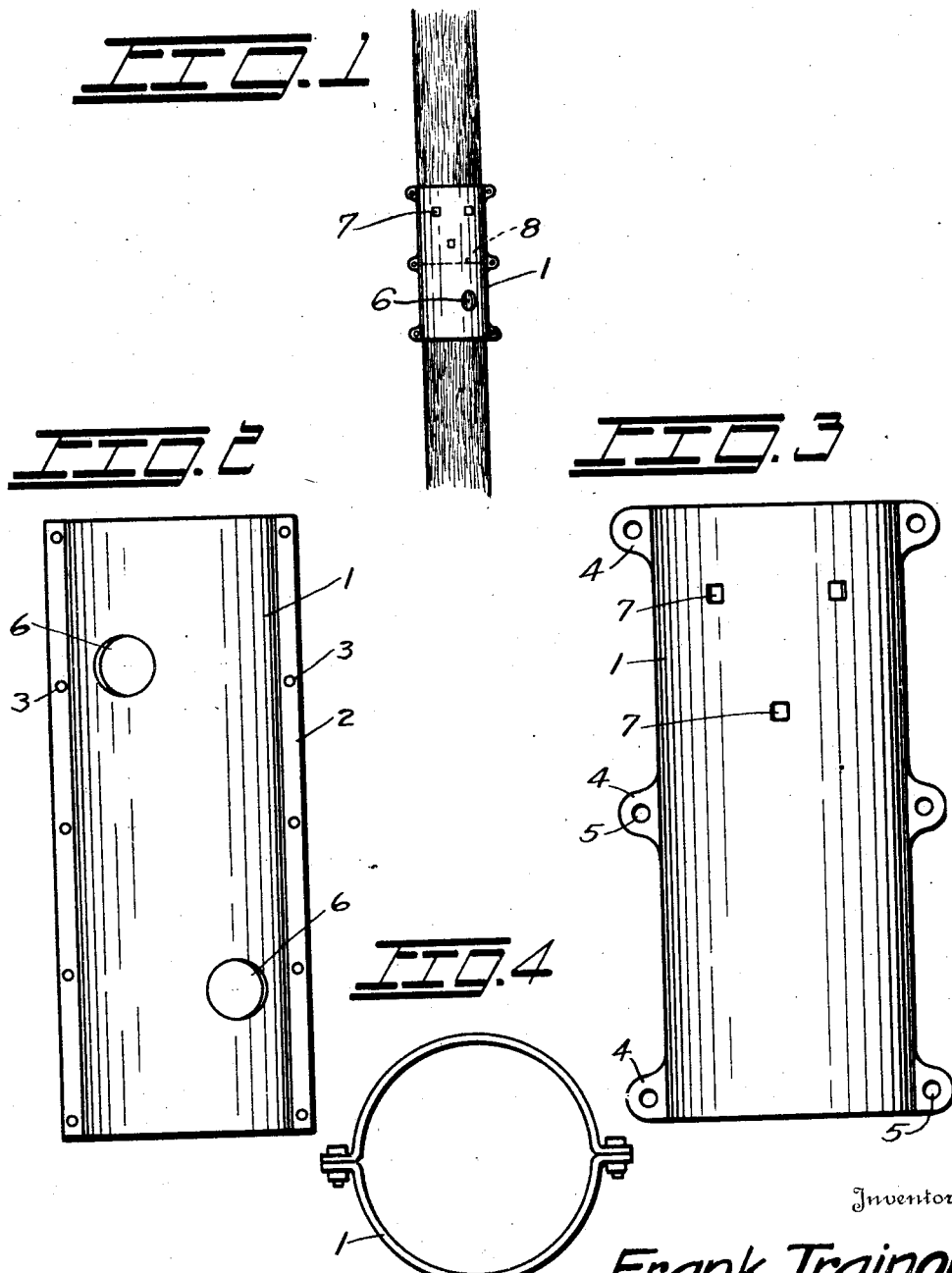

1,688,063

UNITED STATES PATENT OFFICE.

FRANK TRAINOR, OF SEATTLE, WASHINGTON.

SPAR SPLICE.

Application filed October 19, 1926. Serial No. 142,535.

The invention is a device for splicing a spar or the like, which will make it possible to extend a spar as high as may be desired and at the same time retain comparatively the same diameter.

The object of the invention is to provide a device for rigidly splicing spars, or the like.

A further object of the invention is to provide a device for splicing spars which is so constructed that a person climbing the spar with spurs may pass over it.

A further object of the invention is to provide a splice for spars or the like which is so constructed that it may readily be installed in the field.

And a still further object of the invention is to provide a splice for spars or the like which may be rigidly clamped around the spar and which is of a simple and economical construction.

With these ends in view the invention embodies, a device having two semi-circular casings with openings in them and means for clamping the casings together by bolts.

Other features and advantages of the invention will appear from the following description, taken in connection with the drawings wherein:

Figure 1 is a view showing a spar spliced with the device.

Figure 2 is a view showing one side of the device, with continuous flanges.

Figure 3 is a similar view showing the device with ears instead of flanges.

Figure 4 is an end view of the device.

In the drawings the device is shown as it would be made wherein numeral 1 indicates a semi-circular casing, which in the design shown in Figure 2, is provided with continuous flanges 2 having bolt holes 3 in them and in the design shown in Figure 3 is provided with ears 4 having bolt holes 5 in them.

These devices may be provided with openings 6 as shown in Figure 2 through which the spurs of a person climbing the spar may be placed, or it may have openings 7 as shown in Figure 3 through which spikes may be driven to hold the device to the end of the spar, or it is understood that any combination of these openings may be used, as shown in Figure 1.

It is understood that changes may be made in the construction without departing from the spirit of the invention, one of which changes may be in the general design of the casing or in the arrangement of the openings therein, another may be in the changing of the proportionate length of the casing as it is understood that it may be as long as desired, and still another may be in the use of other means of clamping the casing around the spar.

The construction will be readily understood from the foregoing description. To use the device the upper end of the spar may be cut off on the dotted line as indicated by the numeral 8 and another section of the same diameter placed upon it with the device around the two ends. It will be observed that with the upper end of the lower section of the spar rigidly held by guy wires and the upper end of the adjoining section similarly held, the spliced spar will have practically the same rigidity as if it were not spliced. It will also be observed that as many sections as may be desired may be spliced together to form a spar and should a spar break, another section may readily be spliced to it.

Having thus fully described the invention what I claim as new and desire to secure by Letters Patent is:

In a splice for spars or the like, two substantially semi-circular comparatively thin pieces of material having flanged edges and openings therein of a sufficient size to permit spurs entering and holding in the spar within the said splice, said pieces of material also having smaller openings therein to permit the said pieces of material to be spiked to the ends of the spar, and said pieces of material being adaptable to be bolted together through the said flanges and clamped upon the said spar to join two sections of the said spar together.

In testimony whereof, I affix my signature.

FRANK TRAINOR.